United States Patent

[11] 3,602,721

[72] Inventors Tadao Nakamura
Kawasaki-shi;
Shigeaki Nakamura, Kawasaki-shi; Tadao Kohashi, Yokohama, all of, Japan

[21] Appl. No. 775,658
[22] Filed Nov. 14, 1968
[45] Patented Aug. 31, 1971
[73] Assignee Malsushita Electric Industrial Co., Ltd. Osaka, Japan
[32] Priority Nov. 20, 1967
[33] Japan
[31] 42/75022

[54] PHOTOELECTRIC DEVICE WITH ENHANCED PHOTOCONDUCTIVE SENSITIVITY AND STORAGE EFFECT OF INPUT RADIATION
5 Claims, 2 Drawing Figs.

Figure 1:
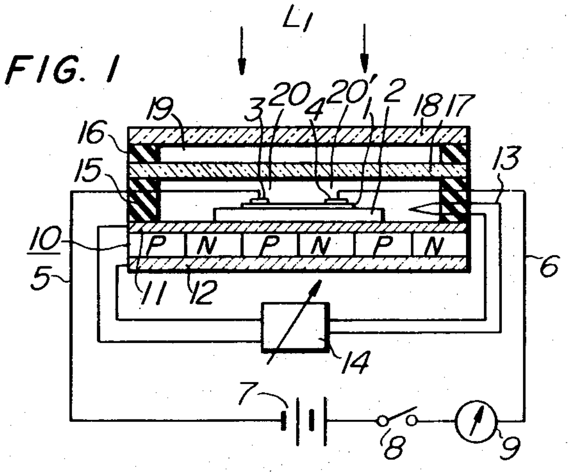

[52] U.S. Cl. .......... 250/238, 250/211, 250/239, 317/234 B
[51] Int. Cl. .......... H01j 7/26
[50] Field of Search .......... 250/200, 211, 217 SS, 238, 239, 89; 317/234, 234 A, 234 B; 313/108 D

[56] References Cited
UNITED STATES PATENTS

| | | | |
|---|---|---|---|
| 2,898,474 | 8/1959 | Rutz | 250/211 |
| 2,918,584 | 12/1959 | Edsbere et al. | 250/239 |
| 3,021,460 | 2/1962 | Milam | 317/234 |

FOREIGN PATENTS

| | | | |
|---|---|---|---|
| 851,048 | 10/1960 | Great Britain | 165/Elect |

*Primary Examiner*—Roy Lake
*Assistant Examiner*—E. R. La Roche
*Attorney*—Stevens, Davis, Miller & Mosher ABSTRACT: A photoelectric device having a photoconductor element consisting of cadmium selenide, cadmium sulfide or a solid solution of cadmium sulfide and cadmium selenide. In the device, the photoconductor element is submerged in silicone oil and cooled down to a low temperature so that it can respond to a radiation input with an improved photoconductive sensitivity.

INVENTORS
TADAO NAKAMURA
SHIGEAKI NAKAMURA
TADAO KOHASHI
BY
Stevens, Davis, Miller & Mosher
ATTORNEYS

PHOTOELECTRIC DEVICE WITH ENHANCED PHOTOCONDUCTIVE SENSITIVITY AND STORAGE EFFECT OF INPUT RADIATION

This invention relates to a photoelectric device comprising a photoconductor element as its essential component.

A photoelectric device including a photoconductor element and necessary electrodes connected with a power supply is used as a detector for detecting light, radiation and the like. Further, a photoelectric device including the combination of a photoconduction element and an electroluminescent element and necessary electrodes connected with a power supply is used as a light intensifier and converter for converting a light or radiation signal into a visible light signal or intensifying an image to obtain an intensified image.

The photoconductor in these photoelectric devices is generally cadmium sulfide, cadmium selenide—cadmium sulfide or cadmium selenide doped with impurities, but as is commonly known, it is extremely difficult to further improve the inherent photoconductive sensitivity of the photoconductor by adding some material thereto or treating it with some material.

The inventors have discovered that the photoconductive sensitivity of the photoconductor can remarkably be improved without resorting to any material treatment. More precisely, the photoconductive sensitivity can be improved by $10^3$ to $10^4$ times the normal value when the photoelectric device, hence the photoconductor element is cooled down to a low temperature. The inventors have also discovered a novel phenomenon that, in the photoconductor element so cooled down to a low temperature, a variation in the photoconductivity which is represented by a time-based integral of a light, radiation or like energy input, can be stored for a very long period of time even after the energy input has been removed.

It has been ascertained that the above phenomenon appears most markedly in the case of powdery photoconductive cadmium selenide and cadmium selenide—cadmium sulfide and a minimum cooling temperature of −50° C. is sufficient. The detector or light intensifier and converter employing these materials are rendered to possess an extremely high sensitivity when cooled down to a temperature in the vicinity of 0° C., and becomes more sensitive when further cooled down to a lower temperature in the order of from −20° C. to −50° C. The conductivity variation taking place in the photoconductor element as a time-based integral of an energy input can be stored therein and derived as an electrical signal, light signal or image at any desired time and by a required number of times over an extended period of time.

However, in order to obtain the effects described above by cooling the photoelectric device containing these photoconductors, there are various problems that should be solved. In the first place, when the photoelectric device is cooled in the atmospheric air, moisture in the air condenses on the surface of the device to produce frost thereon. As is commonly known, the property of photoconductive cadmium sulfide, cadmium selenide and cadmium selenide—cadmium sulfide is remarkably deteriorated when they absorb moisture. In the photoelectric device described above, it is an indispensable condition that the photoconductor be efficiently energized by an energy input directed thereto. Thus, the presence of frost on the surface of the device is especially objectionable when the incoming energy is in the form of light rays since the photoconductor can not properly be energized due to the presence of the frost. Furthermore, the cooling efficiency is very low since the device is placed in the atmospheric air having a considerable temperature. Therefore, cooling of the device within the atmospheric air is unacceptable because it leads to the deterioration of the property of the photoconductor and to the difficulty of energization of the photoconductor by an energy input.

The photoelectric device may be held within a vacuum for cooling in such an atmosphere in order to avoid the adverse effect due to moisture and to improve the cooling efficiency. However, for the proper operation of the detector and the light intensifier and converter described above, these devices must be connected with a power supply for being supplied with a voltage therefrom. The applied voltage is considerably high as is commonly known. On the other hand, the dielectric breakdown voltage in the evacuated space is extremely low in view of electrical discharge caused by remaining gases. As a result, discharge takes place across the power supply electrodes in response to application of an operating voltage, and the operation becomes unstable or no operation can be effected in the worst case. Especially, in a photoelectric device employing a photoconductor layer formed by laminating a powdery photoconductor, discharge between the photoconductor particles is quite marked, and as a result, the rate of equivalent variation in the photoconductivity in response to energization by incoming energy is extremely reduced.

The light intensifier and converter described above is constructed in the form of a plate having a wide surface area so that an input energy image is applied to one surface thereof and a converted, intensified, visible output image can be observed on the other surface thereof. Thus, any body which will obstruct the free transmission of the input energy image and the visible output image must not exist on both the surfaces of the plate structure. Therefore, the device can not be cooled by bringing a cooling element into contact with the surface of the plate structure, and such a cooling element must be disposed adjacent to one end edge of the plate structure so that conduction of heat through the light intensifier and converter plate itself is relied on for the cooling of the same.

In the operation of the light intensifier and converter plate, the plate is connected with a power supply so as to receive electrical energy therefrom. The ohmic loss and dielectric loss thereby given rise to result in a temperature rise throughout the plate surfaces. This temperature rise in conjunction with the energy strength distribution in an input energy image brings forth a temperature rise having a two-dimensional pattern. It is practically unable to overcome such a temperature rise by relying solely on the conduction of heat through the light intensifier and converter plate itself for the uniform cooling of the plate to a low temperature.

It is therefore a primary object of the present invention to provide a useful photoelectric device which is free from the prior difficulties described above.

The photoelectric device according to the present invention includes means for submerging a photoconductor element in a quantity of silicone oil for cooling the same. As pointed in the above, cooling means for cooling the photoelectric device must not deteriorate the property of the photoconductor. However, according to the present invention in which the photoconductor element is submerged in and cooled by the silicone oil, the property of the photoconductor is in no way deteriorated and the photoconductor is prevented from aging by the moistureproofing effect of the silicone oil. In addition to the above advantages, electrical discharge across electrodes or within the photoconductor layer can completely be checked by virtue of the presence of the silicone oil having a high dielectric breakdown voltage and low loss.

Another advantage resides in the fact that the silicone oil which is transparent does not obstruct the energization of the photoconductor by an input energy image and the observation of a visible output image. The cooling efficiency is high because the photoconductor element submerged in the cold silicone oil can be uniformly cooled throughout its plate surfaces. The cold silicone oil may be caused to flow so as to effectively and rapidly remove any nonuniformity in the two-dimensional temperature distribution across the plate surfaces, thereby uniformly cooling the wide surface area to a predetermined low temperature.

A minimum cooling temperature of the order of −50° C. is required as described previously. In this respect too, the silicone oil whose fluidity point is less than −50° C. is quite preferable since it does not lose fluidity at the above-specified cooling temperature.

Figure 2:
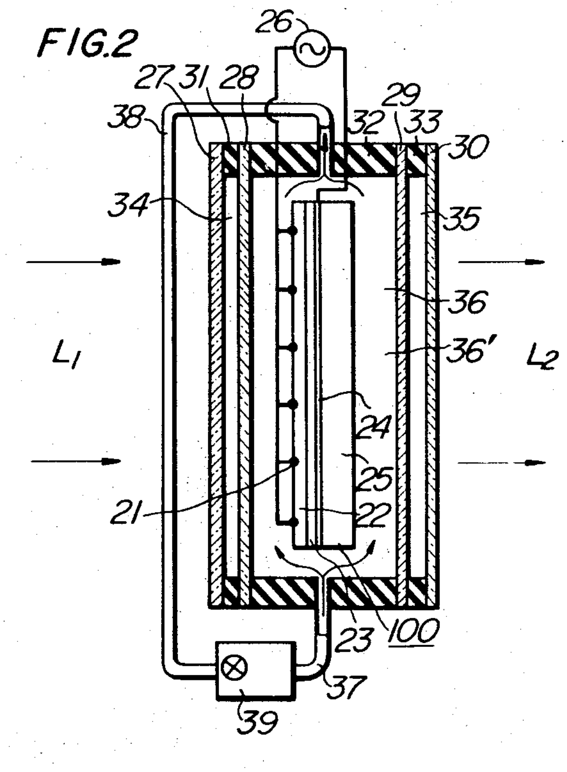

Other objects, features and advantages of the present invention will be apparent from the following description taken in conjunction with the accompanying drawings, in which:

FIG. 1 is a schematic view showing an embodiment of the photoelectric device according to the present invention in section and an associated power supply system; and FIG. 2 is a schematic view showing another embodiment of the present invention in section and an associated power supply system.

Referring to FIG. 1, a photoconductor layer 1 is deposited on a baseplate 2 of electrical insulator such as glass or ceramics. The photoconductor may be photoconductive cadmium selenide, cadmium sulfide or cadmium selenide—cadmium sulfide and is laminated on the base plate 2 by use of an epoxy resin or like binder. A pair of suitably spaced electrodes 3 and 4 are disposed on the photoconductor layer 1 and are connected by way of lead wires 5 and 6 with an operating power supply 7, a switch 8 and an ammeter 9.

The photoelectric device includes a thermoelectric cooler 10 which consists of a pair of metal radiator elements 11 and 12, a plurality of *p*-type semiconductor elements P such as of $Bi_2Te_3sb_2Se_3$, and a plurality of *n*-type semiconductor elements N such as of $Bi_2Te_3$—$Bi_2Se_3$. The radiator elements 11 and 12 are connected with a variable DC power supply 14 which is adapted to be automatically controlled in response to an electrical signal delivered from a thermocouple 13, so that the polarity of the power supply 14 may suitably be switched over for maintaining a constant cooling or heating temperature.

The baseplate 2 is bonded to the heat-absorbing radiator element 11. A plate 17 of, for example, transparent glass pervious to an energy input $L_1$ is spaced apart from the radiator element 11 by a spacer 15 of high-resistance, heat-resistive, thermally insulating material such as adhesive silicone rubber. A plate 18 of, for example, transparent glass is spaced apart from the transparent glass plate 17 by a spacer 16 of high-resistance, heat-resistive, thermally insulating material such as adhesive silicone rubber. The space 19 defined between the transparent glass plates 17 and 18 by the spacer 16 is evacuated for thermal insulation from the atmospheric air. The space 20 defined between the transparent glass plate 17 and the radiator element 11 by the spacer 15 is filled with a quantity of transparent silicone oil 20′ having a low viscosity of less than 30 centistokes.

In the above state, the photoconductor layer 1 is bodily submerged in the silicone oil 20′. In this case, a protective layer or plate of plastics or glass may be provided on the exposed surface of the photoconductor layer 1. It will thus be understood that the silicone oil 20′ and the photoconductor layer 1 are cooled by the heat-absorbing radiator element 11 when the thermoelectric cooler 10 is placed in operation.

An energy input $L_1$ in the form of light rays, X-rays or like radiation may be directed toward the transparent glass plate 18 in the state in which the photoconductor layer 1 is cooled down to about 0° C. due to conduction of heat through the silicone oil 20′ and the baseplate 2. Then when the switch 8 is closed, the reading indicated on the ammeter 9 gives the intensity of the energy input $L_1$ . When the temperature of the photoconductor layer 1 is further lowered down to a value below −20° C., the reading indicated on the ammeter 9 gives the product of the intensity of radiation $L_1$ and the time of illumination, that is, the quantity of integrated energy. The integrating operation is independent of voltage application from the power supply 7 inasmuch as the photoconductor layer 1 is kept at a constant temperature, and thus the quantity of integrated energy can be measured at any desired time by closing the switch 8 when so required. It will be understood therefore that the present invention having means for varying the cooling temperature can be used as a meter for measuring the intensity of light and radiation or as a meter for measuring the quantity of integrated energy.

Referring to FIG. 2, another embodiment of the present invention comprises a light intensifier and converter plate 100 consisting of a stack of a photoconductor layer 22 of the kind described in the preceding embodiment and having an electrode 21 in the form of a plurality of spaced fine metal wires 21, an electroluminescent layer 23 of material such as zinc sulfide, and a transparent glass plate 25 coated with a transparent conductive film 24 of material such as tin oxide. An AC power supply 26 is connected between the electrodes 21 and 24. Support plates 27 and 28 are made from, for example, transparent glass which is pervious to an energy image input $L_1$ in the form of light or radiation. Support plates 29 and 30 are made from, for example, transparent glass which is pervious to a luminous output $L_2$.

The plates 27 and 28, the plates 28 and 29, and the plates 29 and 30 are kept in spaced-apart relation by respective spacers 31, 32 and 33 of adhesive silicone rubber as in the preceding embodiment. The space 34 defined between the plates 27 and 28, and the space 35 defined between the plates 29 and 30 are likewise evacuated for thermal insulation from the atmospheric air. The space 36 defined between the plates 28 and 29 is preferably filled with a quantity of silicone oil 36′ having a low viscosity of less than 30 centistokes and is connected with a silicone oil circulation cooler 39 by way of conduits 37 and 38. A pair of holders of silicone rubber (not shown) are provided to fix the light intensifier and converter plate 100 to the spacer 32 at opposite surfaces of the latter which are at right angles with the plane of the drawing. Thus, the light intensifier and converter plate 100 is submerged in the silicone oil 36′ which is cooled within the space 36. A protective layer or plate of plastics or glass may be provided on the exposed surface of the photoconductor layer 22.

The silicone oil 36′ is cooled by the cooler 39 while being circulated therethrough and is fed into the space 36 through the conduits 37 and 38 for cooling the plate 100. The silicone oil 36′ is circulated with a high efficiency so that the photoconductor layer 22 can uniformly be cooled. A known pump means such as a gear pump may be employed for the circulation of the silicone oil 36′. The cooler 39 may be an electronic cooling means or an evaporation cooling means employing Freon, (trade name for $CCl_2F_2$) liquid nitrogen, dry ice or the like. A temperature detector such as a thermocouple or thermostat may be disposed within the space 36 and the cooling rate or circulating rate of the silicone oil 36′ may be controlled for accomplishing the desired control of the cooling temperature of the photoconductor layer 22. Further, in lieu of disposing the cooling means at the outside of the device as shown, a thermoelectric cooling element may be disposed on the inner surface of the spacer 32, that is, on the inner peripheral edge of the cooling vessel so as to directly cool the silicone oil 36′ within the space 36. In any of the two embodiments described above, an agitating means may be additionally provided for enhancing the effect of uniformly cooling the silicone oil.

It will be understood that an energy input image $L_1$ can be converted into an amplified visible output image $L_2$ by cooling the plate 100 in FIG. 2 to about 0° C., and in a state in which the plate 100 is further cooled down to below −20° C., a stored optical image $L_2$ which is a time-based integral of $L_1$ can freely be observed over an extended period of time. In this case too, provision of cooling temperature control means and heating means is preferred so as to vary the operating characteristics of the device as desired.

It will be appreciated from the foregoing description that the present invention makes possible to control the temperature of the photoconductor element without obstructing the free incidence of incoming energy and without deteriorating the electrical properties of the photoconductor. Thus, the photoconductive sensitivity of the photoconductor can remarkably be improved and the image once stored can be preserved over an extended period of time.

What is claimed is:

1. A photoelectric device comprising a photoconductor element; a container encapsulating said element; silicone oil contained in said container and substantially surrounding said element; means substantially thermally isolating said container from an external ambient temperature; and means cooling said silicone oil and said element to and below a specified low temperature value below room temperature.

2. The photoelectric device according to claim 1, wherein said photoconductor element is selected from the group consisting of cadmium selenide, cadmium sulfide and a solid solution of cadmium sulfide and cadmium selenide.

3. The photoelectric device according to claim 1, wherein said specified temperature value of the element is approximately −20° C. or lower.

4. The photoelectric device according to claim 1, further comprising means creating a flow of silicone oil through said container.

5. The photoelectric device according to claim 4, wherein said flow causing means includes a fluid circulating means.

UNITED STATES PATENT OFFICE
CERTIFICATE OF CORRECTION

Patent No. 3,602,721 Dated August 31, 1971

Inventor(s) Tadao NAKAMURA et al

It is certified that error appears in the above-identified patent and that said Letters Patent are hereby corrected as shown below:

The name of the Assignee should read

--MATSUSHITA ELECTRIC INDUSTRIAL CO., LTD.-- instead of

"Malsushita Electric Industrial Co., Ltd.".

Signed and sealed this 28th day of March 1972.

(SEAL)
Attest:

EDWARD M.FLETCHER,JR.
Attesting Officer

ROBERT GOTTSCHALK
Commissioner of Patents